United States Patent [19]

Body

[11] 4,147,914
[45] Apr. 3, 1979

[54] METHOD FOR MAKING FRICTION BANDS

[75] Inventor: Alexander S. Body, Livonia, Mich.

[73] Assignee: D.A.B. Industries, Inc., Troy, Mich.

[21] Appl. No.: 790,257

[22] Filed: Apr. 25, 1977

[51] Int. Cl.² .............................................. B23K 11/14
[52] U.S. Cl. .................................. 219/86.9; 219/91.2; 219/91.21; 219/93; 228/185
[58] Field of Search .................... 219/86.9, 91.2, 91.21, 219/93; 228/185

[56] References Cited

U.S. PATENT DOCUMENTS

| | | | |
|---|---|---|---|
| 2,948,770 | 8/1960 | Ruscito | 219/91.2 X |
| 3,089,947 | 5/1963 | Frungel | 219/93 X |
| 3,275,790 | 9/1966 | Helms | 219/86.9 X |
| 3,459,918 | 8/1969 | Rzant | 219/86.9 X |
| 3,581,380 | 6/1971 | Talbot | 228/185 X |
| 3,822,457 | 7/1974 | Frost | 219/91.21 X |

OTHER PUBLICATIONS

Welding Handbook, Welding Processes: Gas, Arc and Resistance, 6th ed., Section 2, 1969, p. 26.38.

Primary Examiner—Richard R. Kucia

[57] ABSTRACT

A method of manufacturing a friction band useful as either a brake band or a transmission band is provided. The band includes an arcuate metallic strip lined with a frictional strip. These strips are adhered together while in a flat, straight condition. The adhered strips are then formed into a generally arcuate shape, with the lining strip on the interior. Brackets are then provided on each free end of the metallic strip. The brackets are welded to the metallic strip. Sufficient area of the metallic strip is exposed in the area of the brackets to permit use of closely adjacent electrodes against the bracket and metallic strip.

6 Claims, 5 Drawing Figures

METHOD FOR MAKING FRICTION BANDS

BACKGROUND OF THE INVENTION

The manufacture of friction bands such as transmission bands for automatic vehicle transmissions and brake bands have been relatively expensive. The bands, which have an arcuate shape, comprise an outer metallic strip and an inner friction lining strip. A bracket is applied on each free end of the metallic strip for gripping of the band and tightening around a drum. The brackets have generally been welded to the metallic strip.

In the past, because of the high heat of welding, the metallic strips have first been formed into the arcuate shape desired and the brackets then welded onto the ends. The lining strip has then been adhered to the interior surface of the metallic strip. As will be appreciated, the process of adhering a lining strip to an arcuate metal band is time consuming and expensive. However, in order to avoid damage to the lining strip by the heat of welding, it has been necessary to adhere the lining strip at the last stage of the manufacture of the band.

In U.S. Pat. No. 3,581,380, over which the present invention constitutes an improvement, the lining strip was adhered to the metallic strip before the brackets were welded on. The adhering step was thus accomplished while the strips were flat straight elements and could be accomplished in a relatively inexpensive manner. The two adhered strips were then formed into the desired arcuate shapes and the brackets were welded onto the ends of the metallic strip. The method of welding involved placing one electrode directly against a bracket and placing another electrode against the side edges of the metallic strip for the flow of current between the two electrodes.

One problem with this type of welding is that prior to the welding step, it has been necessary to be sure that the edges of the metallic strip are uniform and that none of the friction material overlaps the edges of the metallic strip which requires additional manufacturing effort.

In accordance with the present invention, it has been learned that it is possible to provide sufficient exposed area of the outer surface of the metallic strip in the area of the brackets to permit closely adjacent contact of the electrodes against the brackets and outer surface of the metallic strip to result in substantially direct flow of current between the electrodes in the area of the desired weld. This minimizes inconsistencies which might occur in welding if the path of the current is not effectively controlled.

SUMMARY OF THE INVENTION

A method of manufacturing a friction band is provided. In the method, a lining strip is adhered to one surface of a generally flat metallic strip. The adhered strips are then formed into a generally arcuate shape, with the lining strip on the interior thereof. A bracket is then welded onto the exterior of each free end of the metallic strip. In this welding step, first electrode means are placed in contact with an exterior portion of a bracket. Second electrode means are placed in contact with the exterior of the metallic strip in closely adjacent relationship to the first electrode means. The electrode means are then electrically energized so that an electrical current flows therebetween to cause welding of the bracket to the metallic strip.

IN THE DRAWINGS

Figure 1:
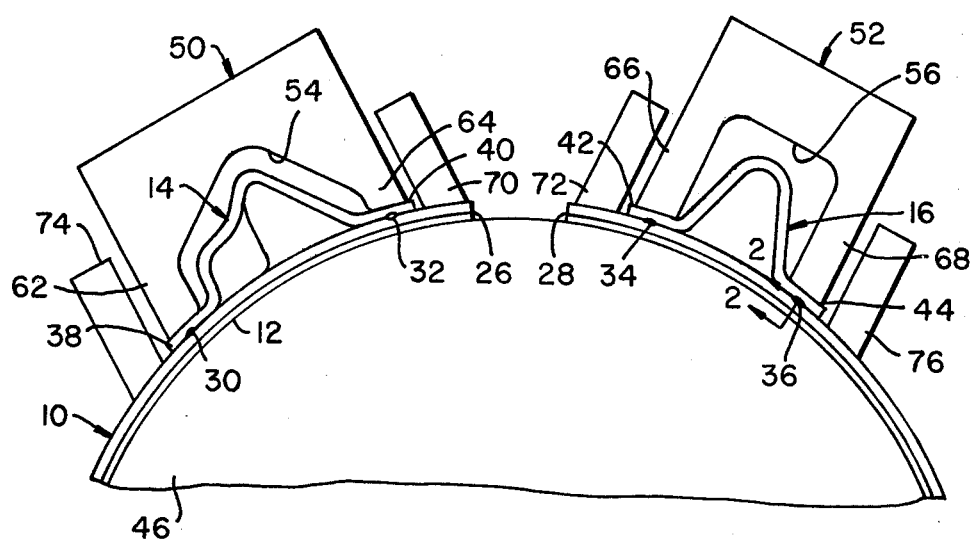
FIG. 1 is a partial view of a friction band illustrating one method of welding brackets in place in accordance with one embodiment of the present invention.
Figure 2:
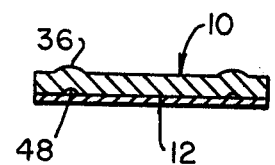
FIG. 2 is a sectional view taken substantially along line 2—2 of FIG. 1 looking in the direction of the arrows.

FIGS. 1 and 2 illustrate the elements from which the friction band is constructed. The band comprises a metallic strip 10 to which is adhered a frictional strip of lining material 12. The strip 10 may be fabricated of any metal having the necessary strength characteristics to form a rigid backing for a band. Conventionally, such strips are fabricated of cold-rolled steel. The strip 10 may have a thickness in the order of 0.065 inch. The lining strip 12 may be fabricated of a variety of different materials. It may be constructed from what is termed "paper" lining of the type formed on a paper making machine and comprising, for example, an asbestos base with cellulose intermixed therein and impregnated with graphite, iron oxide powder, or a resin. Alternately, the lining strip 12 may be of what is termed a "semi-metallic" material which is generally extruded and consists of a base of asbestos and having therein a relatively high content of metallic powders such as copper oxide, iron oxide, carbon, copper chips or woven wire. The lining strip 12 may have a thickness of, for example, 0.029 or 0.042 inch.

A metallic bracket 14, 16 is provided for each free end of the band. The brackets are welded to the metallic strip 10. The function of the brackets is to provide a structure for attachment of power means to open and close the band on a drum.

In the first step of the method, adhesive material is applied to one of the metal strips 10 and lining 12. The strips are then placed together in adhering relationship. The assembly may then be placed into an oven which is operated at an elevated temperature to cure the adhesive material and bond the metal strip 10 to the lining 12.

Alternately, preglued steel may be used to eliminate roller coating and partial cure of the adhesive before applying it to the lining strip. Such preglued steel can be induction bonded, eliminating stacking and oven curing.

Any number of commercially available adhesives may be used in accordance with the invention. Preferably, the adhesive is a thermosetting phenolic material. However, other materials, such as the epoxies, may be used.

Figure 3:
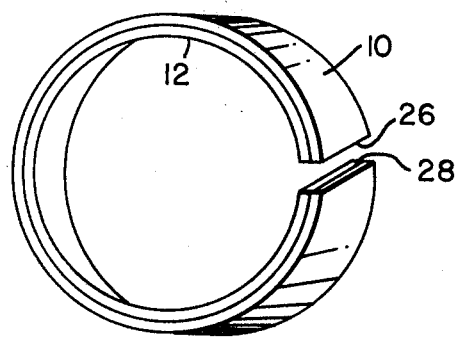
FIG. 3 is a view in perspective of the friction band before welding the brackets thereon.

As illustrated in my copending application, Ser. No. 737,694, filed Oct. 29, 1976, the assembly is then rolled into an arcuate form. The assembly is directed from a guide member between a pair of rollers. One roller is of greater diameter than the other roller. It has been found that this relationship results in a superior rolling action. The larger roller is formed of a material such as polyurethane to provide a good gripping surface. By making this roller larger, it will last longer, it being appreciated that polyurethane is subject to wear. The smaller roller is formed of a hard, metallic material such as steel. As is conventional, the assembly will follow the roller configuration to form into a circular shaped band as shown in FIG. 3. There is a gap between the ends 26, 28, thus permitting the band to be flexed to a smaller diameter to grip a drum.

FIGS. 1 and 2 illustrate the step of the method wherein the brackets 14, 16 are welded onto the metallic strip 10. The ends 26, 28 of the band each have two spaced apart pairs of radially outwardly extending projections 30, 32, 34, 36 stamped therein adapted to be placed in opposed relationship to the bracket feed 38, 40, 42, 44. The circular band is received on a mandrel structure 46.

The provision of the projections 30, 32, 34, 36 extending radially outwardly from the metallic strip 10 is advantageous in that during the welding process the material forming the projections, or at least portions thereof, will tend to collapse into the void, as void 48 in FIG. 2. The voids are formed as a result of the punching action which creates the projections. When the projections are provided on the brackets, a small projection tends to be created on the inner surface of the metallic strip 10 and pushes into the lining strip 12. This forms a wear point in use of the friction band which is undesirable.

After the brackets have been positioned for welding, electrode structures 50, 52 are then placed on each bracket. Each electrode structure has a central opening 54, 56 to receive lug portions 58, 60 of the brackets. Depending electrode leg structures 62, 64, 66, 68 extend into direct contact with the brackets, a portion of each leg structure extending directly over each of the projections. For purposes of identification, electrode structures 50, 52 will be referred to as "welding electrodes".

As will be noted in FIG. 1, the feet 40, 42 of the brackets are spaced from the ends of the metallic strip 10, leaving a space for application of electrodes 70, 72 closely adjacent to the welding electrode legs 64, 66. Additional electrodes 74, 76 are positioned against the metallic strip 10 closely adjacent to the other welding electrode legs 62, 68. For purposes of identification, these latter electrodes will be referred to as "contact electrodes".

After the electrodes have made sufficient physical contact, a high amperage alternating current is applied for a very short time. Because of the positioning of the electrodes, current flows from the welding electrodes through the bracket feet and thence along the metallic strip to the contact electrodes. As will be appreciated, this is a relatively short and well defined path. The good contact of the electrodes with the metal substantially insures a relatively constant flow path which results in satisfactory welding.

It is preferred that the current be applied only for a very short time. One or two cycles of 60 cycles per second alternating current (0.0167–0.0333 second) are satisfactory. Preferably, only a fraction of a cycle is used, for example, one-half of a cycle which equals 0.0083 second. Even less than one-half of a cycle may be used. This short period of applied current reduces any lining damage which may occur as a result of the high heat of welding.

The application of this amperage is sufficient to cause welding of the intended material of the lugs to the metallic strip. In the welding operation, the indented material loses its separate identity and a true weld is formed between the lugs and the metallic strip.

Figure 4:
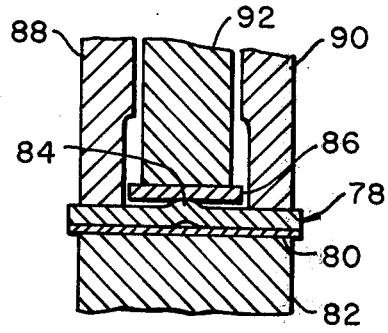
FIG. 4 is a transverse sectional view illustrating another embodiment of the method for welding of a bracket in place.

Another embodiment of the welding procedure is illustrated in FIG. 4. In the FIG. 4 embodiment, metallic strip 78 with adhered lining strip 80, which have been formed into an arcuate band, are positioned on support structure 82. Again, projections 84 are directed radially outwardly from the metallic strip 78. In this embodiment, the bracket feet 86 are narrower than the width of the metallic strip 78, thereby leaving the surface area of the strip 78 unobstructed on either side of the bracket. This permits positionment of contact electrodes 88, 90 on either side of the bracket feet closely adjacent to welding electrode 92 which is placed directly against the bracket feet. Welding is accomplished as above described.

Figure 5:
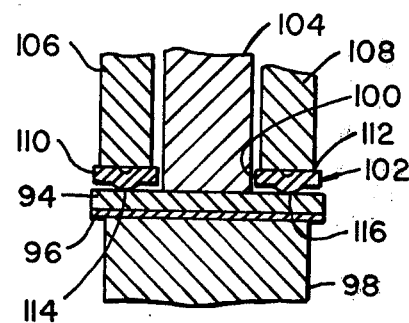
FIG. 5 is a transverse sectional view illustrating another embodiment of the welding step.

Another method for accomplishing the welding step is illustrated in FIG. 5. In FIG. 5, the metallic strip 94 with adhered lining strip 96 are supported on support structure 98. In this case, an opening 100 is provided in the bracket feet 102 permitting introduction of contact electrode 104 directly against the outer surface of the metallic strip 94 closely adjacent to welding electrodes 106, 108 which are placed in direct contact with bracket feet segments 110, 112. In this case, the projections 114, 116 are provided in segments 110, 112, which is the reverse of the procedure previously described. The projections may be provided on the bracket although it is preferable that they be provided on the metallic strip. Welding occurs in the FIG. 5 embodiment as previously described.

What I claim as my invention is:

1. In a method of manufacturing a friction band comprising the steps of adhering a generally flat frictional lining strip to one surface of a generally flat metallic strip, then forming the adhered strips into a generally arcuate shape with the lining strip on the radially inner surface of the arc, then welding a bracket onto the radially outer surface of the metallic strip adjacent each free end thereof, the improvement in welding comprising the steps of punching radially outward projections in said metallic strip adjacent each free end thereof to form recesses on the radially inner side of each projection, locating said bracket in contact with said projections so as to leave a radially outer surface area on the metallic strip adjacent the bracket for placing electrode means, placing first electrode means in contact with an exterior portion of the bracket, placing second electrode means closely adjacent to the first electrode means in contact with said radially outer surface area of the metallic strip, then electrically energizing said electrode means so that an electrical current flows therebetween to cause welding of the bracket to the metallic strip and collapse of at least portions of said projections into said recesses.

2. The method as defined in claim 1, further characterized in that said electrical energization is by means of alternating current of no more than 0.0333 second duration.

3. The method as defined in claim 1, further characterized in that said electrical energization is by means of alternating current of no more than 0.0083 second duration.

4. The method as defined in claim 1, further characterized in that said bracket is located with respect to said free end so as to locate said radially outer surface area on the metallic strip between the bracket and said free end.

5. The method as defined in claim 1, further characterized in that said bracket is narrower than said metallic strip so as to locate said radially outer surface of the metallic strip in two portions between the bracket and each side edge of the metallic strip, said second electrode means being placed on at least one of said portions of said radially outer surface.

6. The method as defined in claim 1, further characterized in that said bracket has opening means in the center thereof so as to expose said radially outer surface area of the metallic strip.

* * * * *